United States Patent [19]

Jacobsen

[11] 4,179,623
[45] Dec. 18, 1979

[54] PULSED LEVEL SENSOR

[75] Inventor: William F. Jacobsen, Toronto, Canada

[73] Assignee: Honeywell Ltd., Scarborough, Canada

[21] Appl. No.: 827,494

[22] Filed: Aug. 25, 1977

[30] Foreign Application Priority Data

Sep. 2, 1976 [CA] Canada ................................. 260390

[51] Int. Cl.$^2$ ......................................... G01N 21/26
[52] U.S. Cl. ..................................... 250/573; 73/293
[58] Field of Search ............. 250/577, 573, 574, 221, 250/222, 214 R, 227; 73/293

[56] References Cited

U.S. PATENT DOCUMENTS

| 2,798,213 | 7/1957 | Rowell | 340/213 |
|---|---|---|---|
| 2,798,214 | 7/1957 | Rowell | 340/213 |
| 3,485,262 | 12/1969 | Perren | 250/577 |
| 3,875,403 | 4/1975 | Svensson | 250/221 |
| 3,882,887 | 5/1975 | Rekai | 340/244 |
| 3,908,129 | 9/1975 | Akers | 250/577 |
| 4,125,779 | 11/1978 | Malinowski | 250/574 |

Primary Examiner—David C. Nelms
Attorney, Agent, or Firm—Trevor B. Joike

[57] ABSTRACT

A material or liquid level sensing system is disclosed having a first triggerable pulse generator connected to a level sensor which is in turn connected to a second triggerable pulse generator wherein the first triggerable pulse generator supplies a pulse to the level sensor which transmits the pulse to trigger the second pulse generator for supplying an output both to an output device and to the first triggerable pulse generator to trigger another pulse to the level sensor and so on. In this manner, the first pulse generator supplied a subsequent pulse to the level sensor depending on whether or not the second triggerable pulse generator has received the previous pulse from the first triggerable pulse generator. Thus, the system continuously supplies pulses to the level sensor as long as the second triggerable pulse generator continues to receive pulses, but these pulses are blocked when the material or liquid being sensed is at a predetermined level and the output means is appropriately activated.

33 Claims, 4 Drawing Figures

PULSED LEVEL SENSOR

BACKGROUND OF THE INVENTION

The invention relates to the sensing of the level of a material, particularly liquids.

Although the invention may be used in many types of applications, the invention is disclosed herein for use in controlling or indicating the level of flammable liquids during the filling operations of tank trucks for purpose of explanation. When tank trucks used for hauling flammable liquids are filled, it is advantageous from a safety standpoint as well as a control standpoint to sense the level of the liquid. Overfilling of such a vehicle or container involves not only waste but the danger of the liquid exploding due to sparks, static electricity or other forms of ignition. It would, of course, be possible for the operator of the filling pumps to make a visual survey of the liquid level of the tank and when the level has reached a predetermined height to terminate the filling operation. However, flammable fluid handling vehicles are often compartmentalized making visual observation of a plurality of tanks impossible or at least very difficult. Also, there may not be the necessary personnel in attendance to supervise the filling operation.

It thus becomes apparent that some form of automatic liquid level control or detection is necessary to supervise the filling operation. The system must also be reliable in view of the grave consequences which could result from the failure of the supervisory system. Therefore, the system should be made as fail-safe as possible.

Various systems have been devised to automatically sense and control the level of material within a container. These systems utilize a wide variety of sensors including capacitive type sensors, contacts, magnetically and mechanically operated switches such as float operated switches, various types of thermal devices and optical sensors. As these systems developed, it became apparent that they could fail allowing the containers to overflow. To solve this problem, various types of fail-safe devices were proposed.

One such device relies on the detection of pulses to control the level of the material being sensed. If the material reached a predetermined level or if any component in the system failed, the sensing signal became continuous instead of pulsating. The continuous signal was sensed to terminate the filling operation or provide the proper indication. Generally, these systems were not sufficiently fail-safe, were expensive to assemble and manufacture and were not reliable.

SUMMARY OF THE INVENTION

A level sensing system is provided having a first triggerable pulse source for supplying a pulse to a level sensor which transmits this pulse, as long as the level of the material being sensed is not at a predetermined level, to a second triggerable pulse source, which is used to trigger the first triggerable pulse source to supply a subsequent pulse to the level sensor. Thus, the first triggerable pulse source will supply a subsequent pulse to the level sensor only after the previous pulse has been received by the second triggerable pulse source to trigger a pulse from the second triggerable pulse source. The system continuously supplies pulses to the level sensor as long as the second triggerable pulse source continues to receive pulses, but when the material reaches the predetermined level, the pulses are blocked. An output means is connected to also receive the pulses from the second triggerable pulse source.

In addition, to safeguard against the possibility that the second source of pulses may fail in a condition to continually energize the output means, a third triggerable pulse source can be connected between the first source of pulses and the output means to allow the output means to be energized by the pulses supplied by the second triggerable pulse source as long as the first triggerable pulse source transmits pulses to the level sensor.

In addition, a fourth source of pulses may be included to be responsive to the cessation of pulses between the first and second triggerable pulse sources to periodically trigger the first pulse source to send a signal to the level sensor for testing the liquid level sensing apparatus. Thus, if any condition which caused the cessation of pulses has terminated, the triggering of the first source of pulses will resume the normal pulsing operation of the apparatus.

BRIEF DESCRIPTION OF THE DRAWINGS

These and other features and advantages will become apparent from a detailed review of the invention taken in conjunction with the drawings in which.

DETAILED DESCRIPTION OF THE INVENTION

Figure 1:
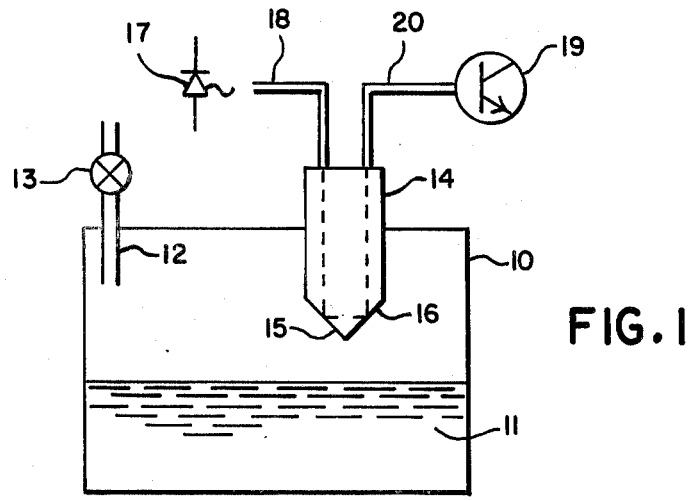
FIG. 1 shows an optical level sensor which can be used in conjunction with the invention.

As mentioned above, the invention is useful for sensing the level of the liquid within a tank. In FIG. 1, tank 10 contains a liquid 11 which may be supplied to tank 10 through a pipe 12 controlled by a valve 13. To sense the level of liquid 11 in tank 10, a prismatic device 14 is positioned through the top of tank 10 with its sensing or reflecting surfaces 15 and 16 at a controllable distance from the top of the tank. A light source 17, in the form of a light emitting diode (LED), supplies light through a fiber optic element 18 which light is transmitted to prismatic device 14 and reflected off surface 15 and then surface 16 and transmitted to a photosensitive device 19 by fiber optic element 20.

The reflecting surfaces 15 and 16 will reflect the light from LED 17 to photosensitive device 19 as long as the liquid 11 remains below the surfaces. When the liquid immerses surfaces 15 and 16, the index of refraction at these surfaces will be changed such that the light will pass through the liquid and will not be reflected to the photosensitive device 19.

Photosensitive device 19 may be utilized to provide an indication of when the level of liquid 11 reaches the predetermined level as determined by the distance of reflecting surfaces 15 and 16 from the top of the tank. Alternatively to or in conjunction with the provision of an indication, photosensitive device 19 may also control valve 13 for filling tank 10 with fluid 11 to the height determined by reflecting surfaces 15 and 16.

Figure 2:
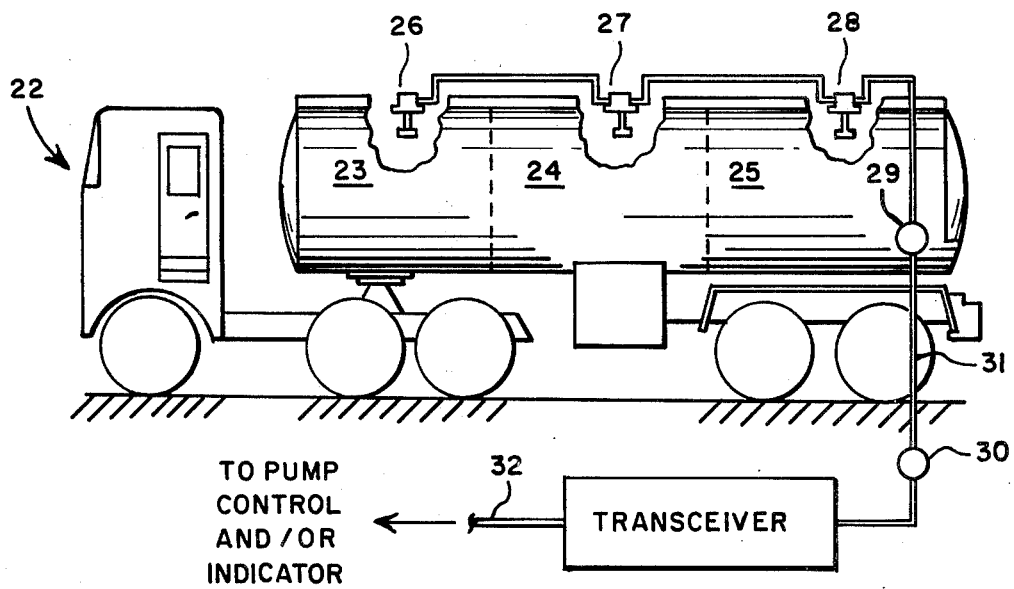
FIG. 2 shows the invention mounted on a flammable fluid carrying vehicle.

Instead of one tank, the invention is also useful in controlling and/or monitoring the fluid or material in a plurality of containers such as the compartments of a flammable fluid hauling tank truck such as truck 22 shown in FIG. 2. Typical fuel hauling trucks are compartmentalized into a plurality of compartments 23, 24 and 25. Each compartment contains a level sensor 26, 27 and 28 respectively which may be of the type shown in FIG. 1. These level sensors are typically connected in series with a light source supplying light to the first prism in sensor 26, a fiber optic carrying the reflected light to the next level sensor 27, a further fiber optic carrying the reflected light to the sensor 28 and a final fiber optic carrying the reflected light from sensor 28 to the photo responsive device or transistor such as that shown in FIG. 1. The supply and output lines to and from the level sensors 26, 27 and 28 are carried by a cable to terminal 29 on truck-trailer 22.

Figure 3:
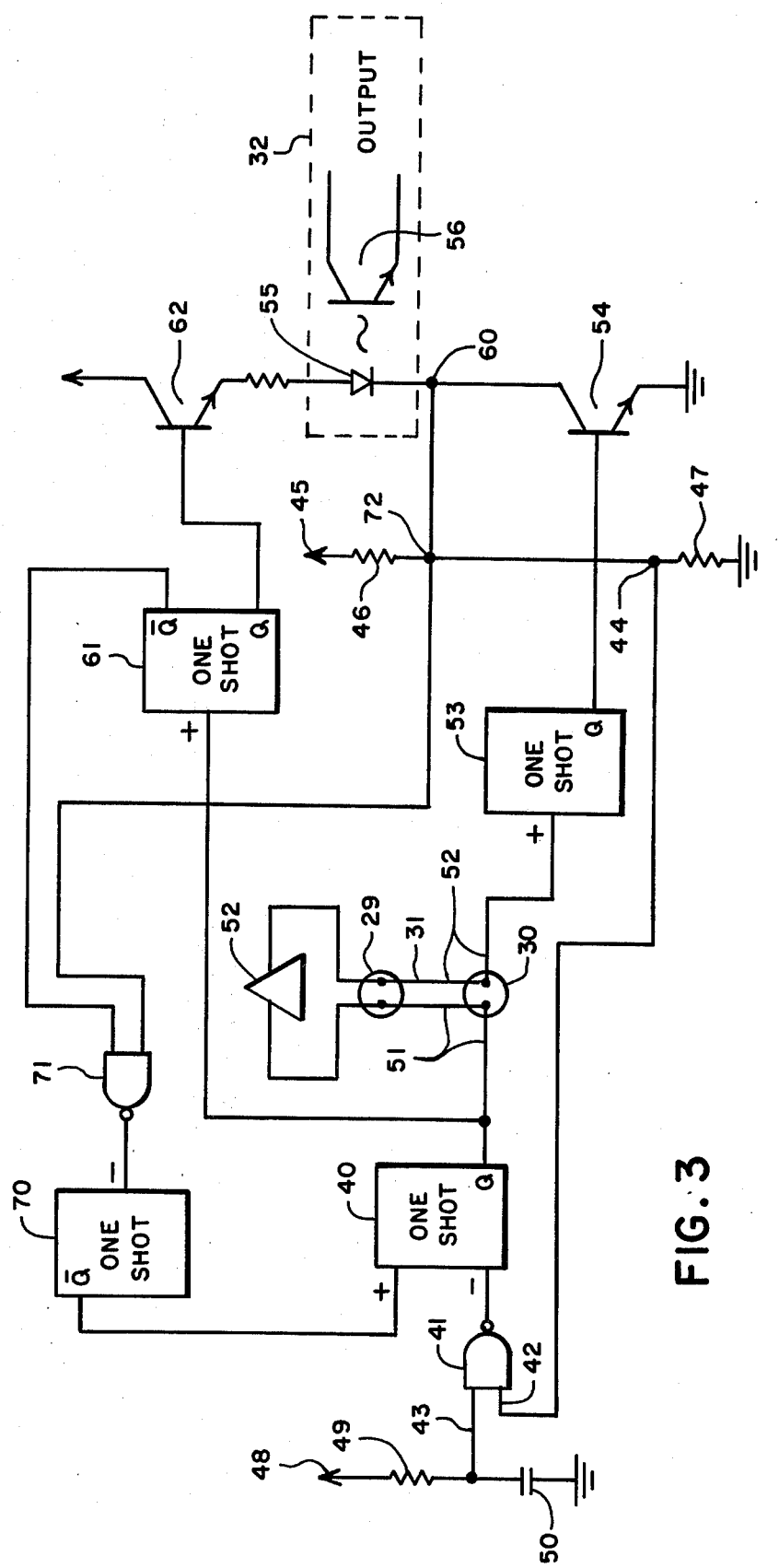
FIG. 3 shows a detailed schematic of the invention.

When the vehicle 22 is being loaded with its flammable fluid, the transceiver, which is shown in more detail in FIG. 3, and pump control together with the terminal 30, all of which are located on the pump island are connected to the truck by cable 31 which connects terminal 30 to terminal 29. The transceiver supplies energy to LED 17 which then supplies light through a prismatic device 14 located at sensor 26 which light is reflected and transmitted to a similar prismatic device at sensor 27 where it is again reflected and supplied to a prismatic device at sensor 28. The light reflected at sensor 28 is then conducted to a photo responsive device, converted to an electrical signal which is supplied back to the transceiver. The transceiver provides an output at 32 for controlling the fluid filling operation and/or providing an indication of when the tanks are filled to the predetermined level.

As the compartments 23, 24 and 25 of vehicle 22 are being filled with fluid, the fluid in the first compartment to reach the level sensor will block the light from being reflected by reflecting surfaces 15 and 16 and the transceiver can provide an appropriate output. This output may be the supply of a signal or the termination of a signal to energize or deenergize a load.

Figure 4:
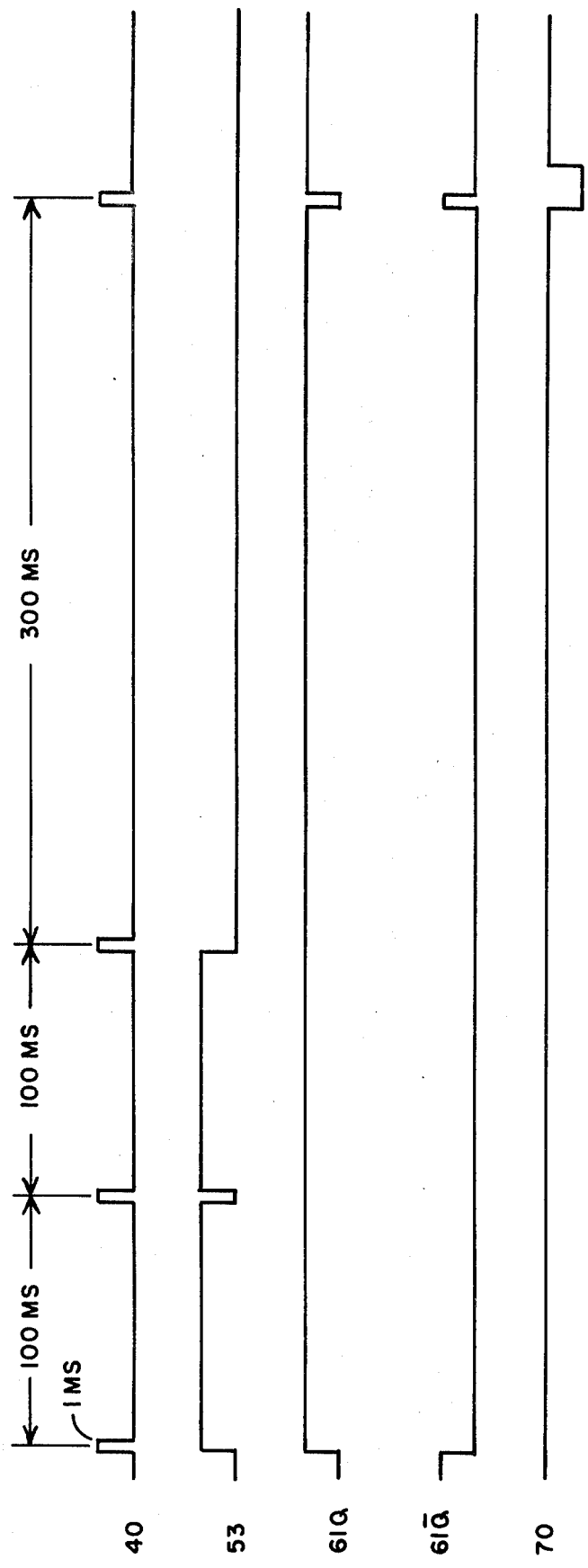
FIG. 4 shows timing diagrams of the circuit shown in FIG. 3.

The transceiver is shown in more detail in FIG. 3 along with the timing chart of FIG. 4. A first triggerable pulse surface is comprised of a one shot multivibrator 40 which, when triggered, will supply an output pulse, of for example 1 millisecond duration, at its output terminal Q. One shot multivibrator 40 may be triggered in one of two ways.

When the compartments of truck 22 are to be filled with a fluid, cable 31 is used to connect terminals 29 and 30 together. When power is initially applied to the circuit, positive potential is applied to terminal 45 which is connected to ground through a voltage divider comprising resistors 46 and 47. Thus, the common junction 44 of resistors 46 and 47 has a positive potential thereto which is supplied to input terminal 42 of NAND gate 41. Positive potential is also supplied to terminal 48 which is connected to ground through the series connection of resistor 49 and capacitor 50. However, since it takes time for capacitor 50 to charge, input terminal 43 of NAND gate 41 is low and the output terminal of NAND gate 41 is, therefore, high. Since the output of NAND gate 41 is connected to the negative trigger terminal of one shot multivibrator 40, multivibrator 40 will not as yet supply an output pulse. As capacitor 50 charges, it reaches a level where terminal 43 goes high and the output terminal of NAND gate 41 goes low which triggers one shot multivibrator 40 to supply a pulse at its Q terminal. This first pulse is then supplied through terminals 29 and 30 by line 51 to the level sensors which, in FIG. 3, are shown as device 51. In actuality, there may be several such devices connected in series as shown in FIG. 2. The pulse on line 51 is supplied to a light emitting device such as light emitting diode 17 of FIG. 1. The light is carried by a fiber optic element such as 18 to the first prism 14 located in the first compartment of the vehicle. The light is reflected by the prism and transmitted by a fiber optic element to the next prism located in the next compartment where it is in turn reflected and supplied to the next prismatic device. Light from the last prismatic device is then transmitted to a photo responsive device such as photo responsive sensor 19. Alternatively, the pulse on line 51 may be used to supply a first light emitting device for supplying light to a first prism 14 which is reflected and energizes a light responsive device 19 for converting the optic signal to electrical. This electrical signal is conducted to the next level sensor where it energizes a light emitting device for supplying light to a prismatic device which reflects that light to a light responsive device for converting the optical signal to electrical and so on until the last electrical signal is then brought back by line 52 through the terminals 29 and 30.

The pulse supplied by one shot multivibrator 40 is transmitted through the level sensing chain 52 and then through line 52 to the positive trigger terminal of one shot multivibrator 53 which comprises a second triggerable pulse source. When the pulse reaches one shot multivibrator 53, multivibrator 53 is triggered to supply a positive output pulse at its Q terminal. This output pulse will have a predetermined duration depending upon the value of the components used in multivibrator 53, e.g. 100 milliseconds. This positive output energizes transistor 54 for supplying energy to the output device 32. The output device 32 comprises a light emitting device 55 and photo responsive device such as photo responsive transistor 56 for controlling the supply of energy from a source to a load where the load may be an indicator or a valve or pump such as 13 shown in FIG. 1. If the anode of diode 55 is connected directly to a source of potential, the gating on of transistor 54 will immediately energize LED 55 for supplying light to transistor 56. When transistor 56 receives the light, it conducts for energizing a pump or indicator. Obviously, the output device 32 may be arranged for energizing or deenergizing a load upon conduction of the transistor 54.

Upon conduction of transistor 54, terminal 44 goes low which causes terminal 42 of NAND gate 41 to be a zero. This causes the output of NAND gate 41 to go high. But because the output of NAND gate 41 is connected to the negative trigger terminal of one shot multivibrator 40, one shot multivibrator 40 is not triggered. It is to be noted that, once capacitor 50 charges, terminal 43 will remain high until power is taken away from terminal 48.

At the end of the output pulse from one shot multivibrator 53, its Q output goes low terminating conduction of transistor 54. Terminal 44 then goes high which causes the output of NAND gate 41 to go low supplying a negative going pulse to one shot multivibrator 40 which supplies a second pulse to the sensing chain 52 for again triggering one shot multivibrator 53. Thereafter, NAND gate 41, forming an input means to one shot multivibrator 40, controls the pulsing of one shot multivibrator 40 in response to one shot multivibrator 53. In this manner, one shot multivibrator 40 cannot produce a pulse to the level sensing chain 52 until its previous pulse has been transmitted through the chain 52 to trigger one shot multivibrator 53. If the pulse is blocked by, for example, the level of liquid 11 reaching the reflecting surfaces of the prism 14 shown in FIG. 1, one shot multivibrator 53 will not receive a pulse and the transistor 54 will remain non-conductive. Also, if there is a failure in the system such that the one shot multivibrator 53 does not receive a pulse input, transistor 54 will remain non-conductive and the filling operation of the truck 22 remains off, safe guarding against the possibility of a failure in the system allowing the overfill of truck 22.

When transistor 54 is non-conductive, light is no longer supplied by LED 55 to photo responsive transistor 56 and the output is deenergized. However, during normal operation of the transceiver, when the Q output of one shot multivibrator 53 goes low at the end of its trigger period, the transistor 54 will become non-conductive which will trigger one shot multivibrator 40 to send a pulse through the chain 52 to trigger one shot multivibrator 53.

As can be seen in FIG. 4, the one millisecond pulse from one shot multivibrator 40 is transmitted through the sensing chain 52 to trigger the 100 millisecond pulse from one shot multivibrator 53. Transistor 54 is energized during the 100 millisecond pulse. At the end of this pulse, one shot multivibrator 40 is triggered to supply another 1 millisecond pulse to sensing chain 52. Transistor 54 is off during the time that the pulse from one shot multivibrator 40 travels down the chain to again trigger one shot multivibrator 53. This time is so short that the load controlled by the output device 32 may be arranged so that it does not provide an indication or terminate the pump or valve actuation. For example, each level sensor connected in series in the level sensing chain 52 may, for example, delay the pulse from reaching one shot multivibrator 53 by 0.1 millisecond from the time that the Q output from one shot multivibrator 53 goes low deenergizing transistor 54. Therefore, the outputs may be arranged so that the pump or valve 13 or any indicator connected to the output is not deenergized until transistor 54 is off for a period longer than 0.4 milliseconds. In the alternative, the output may be pulsed with an on time of 100 milliseconds and an off time of 0.4 milliseconds.

The timing charts of FIG. 4 assume that the third pulse from one shot multivibrator 40 is not received by one shot multivibrator 53. Thus, the Q output of one shot multivibrator 53 remains low, transistor 54 remains off, and one shot multivibrator 40 is not triggered to provide another pulse. Since there is a possibility that the failure of transistor 54 may permanently pull terminal 60 low and LED 55 may, therefore, receive continuous energization, it may be desirable to use a third triggerable pulse source comprising one shot multivibrator 61 and a switch or transistor 62 with transistor 62 being connected between the source of energy and LED 55. The positive trigger terminal of one shot multivibrator 61 is connected to the Q output of one shot multivibrator 40. When open shot multivibrator 61 is triggered, it produces an output pulse, for example, of 300 millisecond duration. From FIG. 4 it can be seen that when power is initially applied and one shot multivibrator 40 produces its first pulse, one shot multivibrator 61 is triggered to supply a positive going output pulse on its Q terminal to transistor 62 for conditioning transistor 62 to conduct. The output pulse from one shot multivibrator 40 is also supplied through the level sensing chain 52 to trigger one shot multivibrator 53 for energizing transistor 54. Since both transistors 54 and 62 are energized, LED 55 is energized to supply light to transistor 56. The output pulse from one shot multivibrator 61 will last, for example, for 300 milliseconds. The output pulse from one shot multivibrator 53 will last, for example, 100 milliseconds such that, at the end of the pulse from one shot multivibrator 53, transistor 54 is turned off and one shot multivibrator 40 supplies a second pulse which retriggers the one shot multivibrators 61. Thus, transistor 62 is continuously energized as long as one shot multivibrator 40 is producing pulses.

As shown in FIG. 4, when the third pulse from one shot multivibrator 40 is not received by one shot multivibrator 53, one shot multivibrator no longer produces pulses and one shot multivibrator 61 will time out at the end of 300 milliseconds from the last pulse from one shot multivibrator 40. At the end of this 300 millisecond period, transistor 62 is deenergized. Should transistor 54 fail in a condition where terminal 60 is permanently grounded or low, the input terminal 42 of NAND gate 41 is continuously low and one shot multivibrator 40 will no longer be producing pulses. If one shot multivibrator 61 has not received a pulse in 300 milliseconds, it times out and its Q terminal goes low for deenergizing transistor 62 which deenergizes LED 55 even though transistor 54 has failed in a conducting mode.

It may also be desirable, once the system has shut down, to periodically sample the system. It may be, for example, that one of the prismatic devices has improperly and momentarily blocked the sensing signal pulses or a short term failure in the system has occurred to prevent the pulses from one shot multivibrator 40 from reaching one shot multivibrator 53. To accomplish this periodic sampling, a fourth triggerable pulse source comprising a one shot multivibrator 70 has its $\overline{Q}$ terminal connected to the positive trigger terminal of one shot multivibrator 40. The negative trigger terminal of one shot multivibrator 70 is connected to the output of NAND gate 71 which has one input connected to the $\overline{Q}$ terminal of one shot multivibrator 61 and its other input terminal connected to junction 72 which junction is connected to junctions 60 and 44.

If the system is pulsing correctly, the $\overline{Q}$ output of one shot multivibrator 61 is continuously low and junction 72 is cycling between lows and highs. However, since the input to NAND gate 71 from the $\overline{Q}$ terminal of one shot multivibrator 61 is continuously low, the output of NAND gate 71 will be continuously high. The $\overline{Q}$ output from one shot multivibrator 70 is therefore, continuously high which will not trigger one shot multivibrator 40. In FIG. 4, if the third pulse from one shot multivibrator 40 is not received by one shot multivibrator 53, junctions 60, 44 and 72 will remain high and, at the end of 300 milliseconds, the $\overline{Q}$ output of one shot multivibrator 61 will go high which causes NAND gate 71 to supply a low at its output to trigger one shot multivibrator 70 for supplying a negative going pulse which at the end of its duration will trigger one shot multivibrator 40 which in turn supplies a pulse to both one shot multivibrators 61 and 53. If this pulse is not received by one shot multivibrator 53, its output remains deenergized, one shot multivibrator 61 will return its Q terminal to a high state after 300 milliseconds to again trigger one shot multivibrator 70 for causing one shot multivibrator 43 to supply another pulse. If, on the other hand, one shot multivibrator 53 receives this pulse, normal pulsing will be resumed. Thus, every 300 milliseconds plus the pulse duration of one shot multivibrator 70, the system is tested to see if the condition which caused termination of the pulses being received by one shot multivibrator 53 is cleared.

If there is a failure in the system such that junction 60 is improperly low, pulsing between one shot multivibrators 40 and 53 ceases and, after 300 milliseconds, the Q terminal of one shot multivibrator 61 goes low and the $\overline{Q}$ terminal goes high. This change in state of the $\overline{Q}$ terminal of one shot multivibrator 62 will not result in the triggering of one shot multivibrator 70 since junction 72 is now low and the output of NAND gate 71 cannot change. Therefore, there is no sampling when, because of a failure in the system, junction 60 is low.

One shot multivibrators 40, 53, 61 and 70 may be CD4047 multivibrators manufactured by RCA.

The embodiments of the invention in which an exclusive property or right is claimed are defined as follows:

1. An apparatus for continuously supplying pulses to sense the level of a material and for terminating said pulses when said material is at a predetermined level comprising:
   first triggerable pulse means for supplying a pulse, said first triggerable pulse means having input means;
   level sensing means connected to said first triggerable pulse means for transmitting said pulse to an output, and for blocking said pulse when said material is at a predetermined level;
   second triggerable pulse means connected to said output of said level sensing means whereby said second triggerable pulse means is triggered by said pulse for supplying a pulse to an output;
   means connecting said output of said second triggerable pulse means to said input means of said first triggerable pulse means whereby said pulse supplied by said second triggerable pulse means triggers said first triggerable pulse means to produce a second pulse; and,
   output means connected to said output of said triggerable pulse means,
   whereby said first triggerable pulse means supplies a pulse to said level sensing means each time said input means receives a pulse from second triggerable pulse means.

2. The apparatus of claim 1 wherein said first triggerable pulse means comprises a first one shot multivibrator having an input connected to said input means and an output wherein said level sensing means is connected to said output of said one shot multivibrator.

3. The apparatus of claim 2 wherein said second triggerable pulse means comprises a second one shot multivibrator having an input connected to said output of said level sensing means and having an output and switching means having an input connected to said output of said second one shot multivibrator, said switching means having an output wherein said output of said switching means is connected to both said output means and said input means of said first triggerable pulse means.

4. The apparatus of claim 3 further comprising sampling means responsive to cessation of pulses to periodically trigger said first one shot multivibrator.

5. The apparatus of claim 4 wherein said sampling means comprises one shot multivibrator means having first input means responsive to said pulse from said first triggerable pulse means and second input means responsive to said pulse from said second triggerable pulse means and an output connected to trigger said first triggerable pulse means to periodically sample said apparatus when said second triggerable pulse means has failed to receive a pulse from said level sensing means.

6. The apparatus of claim 3 further comprising third triggerable pulse means having an input connected to said output of said first one shot multivibrator and an output connected to said output means.

7. The apparatus of claim 6 wherein said third triggerable pulse means comprises a third one shot multivibrator having an input connected to said output of said first one shot multivibrator and an output and switching means having an input connected to said output of said third one shot multivibrator and an output connected to said output means.

8. The apparatus of claim 7 wherein said input means comprises a NAND gate having an output connected to the input of said first one shot multivibrator and having first and second inputs, said first input of said NAND gate connected to a means responsive to application of power to said apparatus for causing said NAND gate to supply a trigger signal to said first one shot multivibrator and said second input of said NAND gate connected to said output of said switching means of said second triggerable pulse means.

9. The apparatus of claim 8 further comprising sampling means responsive to cessation of pulses to periodically trigger said first one shot multivibrator.

10. The apparatus of claim 9 wherein said sampling means comprises fourth one shot multivibrator means having a first input connected to an output of said third one shot multivibrator and a second input connected to said output of said switching means of said second triggerable pulse means and an output connected to an input of said first one shot multivibrator.

11. The apparatus of claim 7 further comprising sampling means responsive to cessation of pulses to periodically trigger said first one shot multivibrator.

12. The apparatus of claim 11 wherein said sampling means comprises one shot multivibrator means having a first input connected to an output of said third one shot multivibrator and a second input connected to said output of said switching means of said second triggerable pulse means and an output connected to an input of said first one shot multivibrator.

13. The apparatus of claim 1 further comprising sampling means responsive to cessation of pulses to periodically trigger said first triggerable pulse means.

14. The apparatus of claim 13 wherein said sampling means comprises one shot multivibrator means having first input means responsive to said pulse from said first triggerable pulse means and second input means responsive to said pulse from said second triggerable pulse means and an output connected to trigger said first triggerable pulse means to periodically sample said apparatus when said second triggerable pulse means has failed to receive a pulse from said level sensing means.

15. The apparatus of claim 1 further comprising third triggerable pulse means having an input connected to first triggerable pulse means and an output connected to said output means.

16. The apparatus of claim 15 further comprising sampling means responsive to cessation of pulses between said first and second triggerable pulse means to periodically trigger said first triggerable pulse means.

17. An apparatus for sensing the level of liquids comprising:
   first triggerable pulse means having input means and an output, said first triggerable pulse means supplying pulses to said output, one of said pulses being generated each time a pulse is received at said input means;

liquid level sensing means having an input connected to said output of said first triggerable pulse means and having an output for transmitting said pulses supplied by said first triggerable pulse means to said output of said liquid level sensing means, and for blocking said pulses when said liquid is at a predetermined level;

second triggerable pulse means connected to said output of said liquid level sensing means, whereby said second triggerable pulse means is triggered by each of said pulses supplied by said first triggerable pulse means and transmitted by said liquid level sensing means, for supplying a corresponding pulse to an output;

means connecting said output of said second triggerable pulse means to said input means of said first triggerable pulse means whereby said corresponding pulse supplied by said second triggerable pulse means comprises said pulse received at said input means; and, output means connected to said output of said second triggerable pulse means.

18. The apparatus of claim 17 wherein said first triggerable pulse means comprises a first one shot multivibrator having an input connected to said input means and an output wherein said liquid level sensing means is connected to said output of said first one shot multivibrator.

19. The apparatus of claim 18 wherein said second triggerable pulse means comprises a second one shot multivibrator having an input connected to said output of said liquid level sensing means and having an output and switching means having an input connected to said output of said second one shot multivibrator, said switching means having an output wherein said output of said switching means is connected to both said output means and said input means of said first triggerable pulse means.

20. The apparatus of claim 19 further comprising sampling means responsive to cessation of pulses to periodically trigger said first one shot multivibrator.

21. The apparatus of claim 20 wherein said sampling means comprises one shot multivibrator means having first input means responsive to said pulse from said first triggerable pulse means and second input means responsive to said pulse from said second triggerable pulse means and an output connected to trigger said first triggerable pulse means to periodically sample said apparatus when said second triggerable pulse means has failed to receive a pulse from said level sensing means.

22. The apparatus of claim 19 further comprising third triggerable pulse means having an input connected to said output of said first one shot multivibrator and an output connected to said output means.

23. The apparatus of claim 22 wherein said third triggerable pulse means comprises a third one shot multivibrator having an input connected to said output of said first one shot multivibrator and an output and switching means having input connected to said output of said third one shot multivibrator and an output connected to said output means.

24. The apparatus of claim 23 wherein said input means comprises a NAND gate having an output connected to the input of said first one shot multivibrator and having first and second inputs, said first input of said NAND gate connected to a means responsive to application of power to said apparatus for causing said NAND gate to supply a trigger signal to said first one shot multivibrator and said second input of said NAND gate connected to said output of said switching means of said second triggerable pulse means.

25. The apparatus of claim 24 further comprising sampling means responsive to cessation of pulses to periodically trigger said first one shot multivibrator.

26. The apparatus of claim 25 wherein said sampling means comprises one shot multivibrator means having a first input connected to an output of said third one shot multivibrator and a second input connected to said output of said switching means of said second triggerable pulse means and an output connected to an input of said first one shot multivibrator.

27. The apparatus of claim 23 further comprising sampling means responsive to cessation of pulses to periodically trigger said first one shot multivibrator.

28. The apparatus of claim 27 wherein said sampling means comprises one shot multivibrator means having a first input connected to an output of said third one shot multivibrator and a second input connected to said output of said switching means of said second triggerable pulse means and an output connected to an input of said first one shot multivibrator.

29. The apparatus of claim 17 further comprising sampling means responsive to cessation of pulses to periodically trigger said first triggerable pulse means.

30. The apparatus of claim 29 wherein said sampling means comprises one shot multivibrator means having first input means responsive to said pulse from said first triggerable pulse means and second input means responsive to said pulse from said second triggerable pulse means and an output connected to trigger said first triggerable pulse means to periodically sample said apparatus when said second triggerable pulse means has failed to receive a pulse from said level sensing means.

31. The apparatus of claim 17 further comprising third triggerable pulse means having an input connected to first triggerable pulse means and an output connected to said output means.

32. The apparatus of claim 31 further comprising sampling means responsive to cessation of pulses between said first and second triggerable pulse means to periodically trigger said first triggerable pulse means.

33. In a level sensing system having a source for generating a sensing signal, a level sensor for sensing the level of material and for transmitting said sensing signal to an output and for blocking said sensing signal when said material is at a predetermined level, and an output means connected to the output of said level sensor, the improvement comprising means responsive to cessation of said sensing signal for periodically energizing said source to periodically supply a signal to said level sensor whereby said level sensing system is periodically tested to determine whether sensing signal can be resumed.

* * * * *